UNITED STATES PATENT OFFICE.

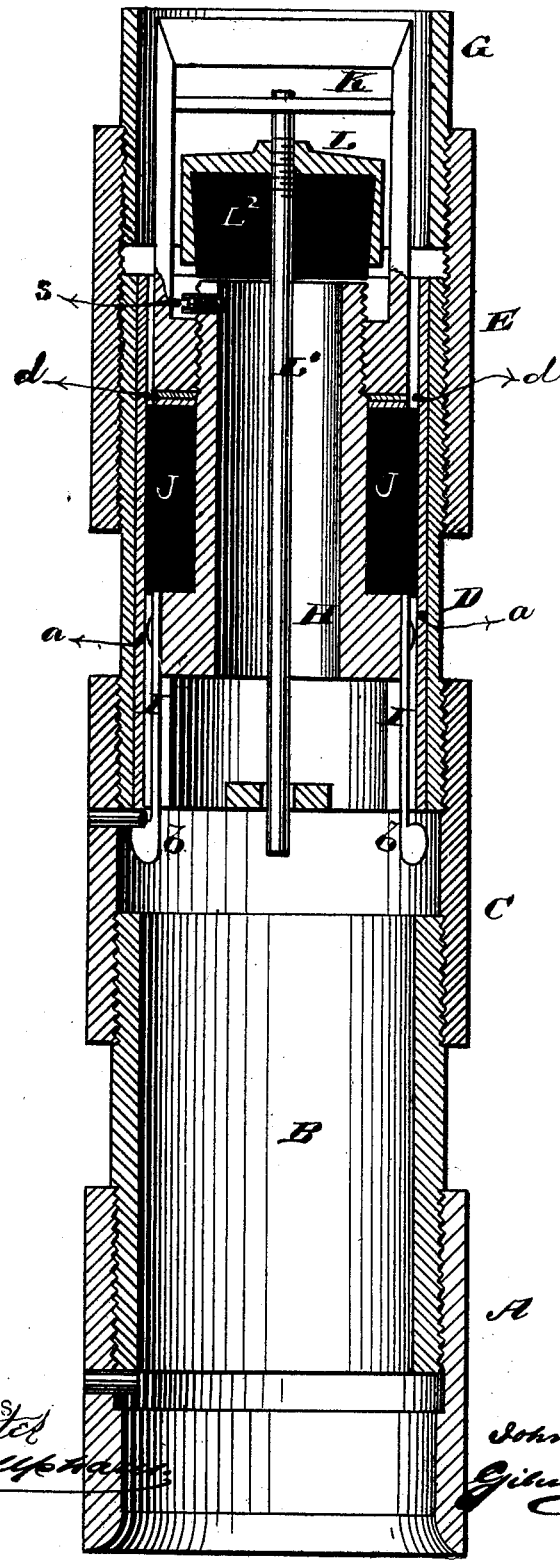

JOHN Q. ADAMS, OF KALAMAZOO, MICHIGAN.

IMPROVEMENT IN PUMP AND WELL.

Specification forming part of Letters Patent No. 195,782, dated October 2, 1877; application filed September 8, 1877.

*To all whom it may concern:*

Be it known that I, JOHN Q. ADAMS, of Kalamazoo, in the county of Kalamazoo and State of Michigan, have invented a new and valuable Improvement in Pumps and Wells; and I do hereby declare that the following is a full, clear, and exact description of the construction and operation of the same, reference being had to the annexed drawings, making a part of this specification, and to the letters and figures of reference marked thereon.

The figure of the drawings is a representation of a vertical central sectional view of my pump and well.

The nature of my invention consists in certain improvements upon the combined pump and well for which Letters Patent No. 182,143 were granted to me September 12, 1876, as will be hereinafter more fully set forth.

The annexed drawing, to which reference is made, fully illustrates my invention.

A represents the cylindrical sleeve at the bottom of the combined pump and well. B is the first section of pipe or tube contained between the sleeve A and coupling C. D is the second section of pipe, or the first one above the coupling C, in which the plunger or lifting-valve works. The coupling E and pipe G are the remaining portion, or that part of the pipe or tube which is of the greatest diameter. The two bottom sections B and D of the pipe or tube are made of a reduced interior diameter by using thicker pipe or tube for said sections, or in any other suitable manner, so as to be of a lesser diameter than the inside of the pipe or tube above said sections, or any portion of the same. The object of this is that, having a larger diameter through the greater portion of the pipe, it enables me to reach that portion in which the valves work with ease and without injury to the valves or packing, and also have a perfect fit when it reaches the desired place. It also, further, gives ease in removing the plunger or lifting-valve for repacking. The section D, in which the plunger or lifting-valve works, is provided with a lining, $a$, of brass or other suitable metallic substance, to reduce the section to the proper interior diameter and also form a suitable seat for the plunger or lifting-valve to work in. H is the inside tubular section, provided with plate-springs I I, having lugs or catches $b\ b$ formed on their lower ends. Above said springs the outside of the section H is recessed to receive a rubber packing, J. Above this packing are one or more metal washers, $d$, and above the same is screwed a cage, K, tightly down upon the rubber packing, to make the same expand and completely fill the space between the inner and the outer tubes, and to clamp them tightly together. In the upper end of the tube or section H is then inserted a small set-screw, $e$, which prevents the two parts H and K from coming apart.

Within the cage K is a check-valve composed of an inverted cup, L, with rod $L^1$, the latter passing through guides in the cage K and tube H.

The cup L is chamfered out inside, so as to be larger at the top than at the bottom of opening, and the packing $L^2$ is made to fit the same. This construction holds the packing $L^2$, of rubber or other material, from slipping out, and makes the valve more certain to hold water from leaking back, and makes it less liable to get out of order.

What I claim as new, and desire to secure by Letters Patent, is—

1. In a combined pump and well composed of two or more sections of pipe coupled together, that portion or section in which the plunger and lifting-valve work made of lesser interior diameter than the portion of the pipe or tube above the same, for the purposes herein set forth.

2. In a combined pump and well composed of two or more sections of pipe coupled together, a lining, $a$, of brass or other metal, within that portion or section in which the plunger and lifting-valve work, for the purposes herein set forth.

3. The set-screw $e$, in combination with the tube H, cage K, and packing J, as and for the purposes set forth.

4. The combination of the cup L, chamfered out as described, and the packing $L^2$, fitting therein, to form a check-valve, as and for the purposes set forth.

In testimony that I claim the above I have hereunto subscribed my name in the presence of two witnesses.

JOHN Q. ADAMS.

Witnesses:
JAMES M. DAVIS,
EDGAR DOUGLASS.